United States Patent [19]

Pollack

[11] 4,366,211

[45] Dec. 28, 1982

[54] CONTROL OF ELECTROLYTE FILL TO FUEL CELL STACK

[75] Inventor: William Pollack, Scott Township, Allegheny County, Pa.

[73] Assignee: Westinghouse Electric Corp., Pittsburgh, Pa.

[21] Appl. No.: 303,809

[22] Filed: Sep. 21, 1981

[51] Int. Cl.³ .............................................. H01M 2/14
[52] U.S. Cl. ....................................... 429/38; 429/72; 429/210
[58] Field of Search ....................... 429/38, 72, 34, 210

[56] References Cited

U.S. PATENT DOCUMENTS

| | | | |
|---|---|---|---|
| 3,615,845 | 10/1971 | Gray | 136/86 |
| 3,748,179 | 7/1973 | Bushnell | 136/86 R |
| 3,814,631 | 6/1974 | Warzawski et al. | 136/86 |
| 3,905,832 | 9/1975 | Trocciola | 136/86 R |
| 3,926,676 | 12/1975 | Frie | 136/86 R |
| 4,168,349 | 9/1979 | Buzzelli | 429/14 |

*Primary Examiner*—Charles F. Lefevour
*Attorney, Agent, or Firm*—W. E. Otto; E. L. Levine

[57] ABSTRACT

A fuel cell stack which can be operated with cells in a horizontal position so that the fuel cell stack does not have to be taken out of operation when adding an electrolyte such as an acid. Acid is supplied to each matrix in a stack of fuel cells at a uniform, low pressure so that the matrix can either be filled initially or replenished with acid lost in operation of the cell, without exceeding the bubble pressure of the matrix or the flooding pressure of the electrodes on either side of the matrix. Acid control to each cell is achieved by restricting and offsetting the opening of electrolyte fill holes in the matrix relative to openings in the plates which sandwich the matrix and electrodes therebetween.

25 Claims, 9 Drawing Figures

CONTROL OF ELECTROLYTE FILL TO FUEL CELL STACK

GOVERNMENT CONTRACT

The invention disclosed herein was made or conceived in the course of, or under, a contract with the U.S. Government identified as No. DEN3-161.

CROSS-REFERENCE TO RELATED APPLICATION

This application is related to a related application designated under and identified by Ser. No. 303,810 filed Sept. 21, 1981, entitled Low Hydrostatic Head Electrolyte Addition to Fuel Cell Stacks and invented by R. E. Kothmann and is known to the inventor of the subject matter of the present application, filed concurrently herewith. The disclosure of the aforesaid application identified as Ser. No. 303,810 is incorporated herein by reference as the disclosure therein is related to the subject matter of the present application.

BACKGROUND OF THE INVENTION

1. Field of the Invention

This invention is concerned with a fuel stack having a non-circulating, replenishable electrolyte. More particularly, the invention is concerned with a fuel cell which is one of the components of a stack of fuel cells.

The invention is particularly concerned with electrochemical cells utilizing an electrolyte which is intended to fill up a porous matrix to obtain a more uniform pressure with less weight of acid or electrolyte pressing down onto the matrix.

Acid or other electrolyte is supplied to each matrix in a stack of fuel cells at a uniform, low pressure so that the matrix can either be filled initially or replenished with acid, lost in the operation of the cell, without exceeding the bubble pressure of the matrix or the flooding pressure of the electrodes on either side. Acid control to each cell is achieved by restricting the opening in the acid fill holes with the matrix which is to be wet.

The present invention is more particularly concerned with the acid fill of a phosphoric acid fuel cell stack in which no external controls are necessary to control the flow of acid to the matrix or other fuel cell components. Further, it is not necessary with the present invention to take the fuel stack out of operation in order to maintain the matrix suitably wetted with the electrolyte or to reverse or change the position of the fuel stack.

2. Description of the Prior Art

Acid in a typical phosphoric acid fuel cell is contained in a thin porous member, referred to as the matrix. The matrix is located between two gas electrodes of the cell. Once the cell is assembled, acid additions are made to the matrix from an acid reservoir channel. At either end of this channel are located fill holes which in an assembled stack communicate with each other and form a continuous pipe through the stack.

The acid in each matrix of each cell must be maintained in a saturated condition (or a continuous film which cannot be perforated by the gases flowing on either side of the electrodes abutting the matrix) during its operation. Any excess acid should reside in the acid reservoir, but it should not be allowed to flood the electrodes and subsequently the process gas channels on the reverse side of the electrodes.

In a stack of more than a few cells, it has been the practice to add acid to the cells only when the cells are in a vertical position, although the cells operate in a horizontal position; the acid pressure to each cell can thus be maintained at a low and equal value to each matrix. If additions are made to cells held in a horizontal position, and the acid fill holes in the stack would be filled completely, therefore, each cell matrix would have a different acid pressure depending on its location in the stack. For a stack in which it is desired to limit the bubble pressure of the matrix to, for example, six inches of water, only a small number of cells could be incorporated without causing undesirable flooding of components of the lower cells. When the acid is added to cells arranged in a vertical position, then the addition to a dry matrix or replacement to a wet matrix is further restricted by the height of the matrix, above the acid reservoir and the physical properties of the matrix and the phosphoric acid electrolyte.

Reference is made to U.S. Pat. No. 3,748,179 to Bushnell which is incorporated herein by reference and is directed to a "Matrix-type" of fuel cell with circulated electrolyte. In general, the cell includes an anode, a cathode, a matrix with an ion-conductive electrolyte between the anode and cathode, and porous pins are provided to conduct the electrolyte to the matrix. Oxidant, fuel and electrolyte are applied to the cell at one end thereof by pumping and withdrawn from another end opposite the one end. Each cell forming the stack of cells has a separate inlet for the electrolyte at the said one end, and a separate outlet for the electrolyte at the other end. Flow of the electrolyte is direct from one end to the other with the only circulation taking place through the porous pins. The electrolyte flows into the electrolyte chamber of each individual cell when they are stacked in a vertical condition.

U.S. Pat. No. 4,168,349 to Buzzelli, which is incorporated by reference, is directed to an Iron/Air Battery System having Circulating Electrolyte and a Horizontal Cell Configuration. Each cell of the horizontally disposed stack of cells includes its own individual electrolyte inlet and electrolyte outlet with the electrolyte being pumped in a horizontal direction through each cell. The electrolyte supplied to one cell does not circulate through the next adjacent cell, and the outlet is larger than the inlet so that the electrolyte is pulled out of the cell, and the outlet cross-sectional area is between 1.25 to 5 times the area of the inlet cross-sectional area.

U.S. Pat. No. 3,905,832 to Trocciola, which is incorporated by reference, discloses a fuel cell structure containing an electrolyte reservoir within the cell structure for supplying electrolyte as needed to the conventional matrix.

U.S. Pat. No. 3,615,845 to Gray discloses a fuel cell in which the electrolyte is wicked through capillary conduits for even distribution along the length of the matrices between the anodes and cathodes. Make up electrolyte is to be fed to the matrices during long term cell operation at whatever rate the matrices will absorb the electrolyte.

U.S. Pat. No. 3,814,631 to Warszawski et al. discloses a framed electrode with electrolyte supply orifices on one side and drainage orifices on the other side. The channels from each of the orifices have a cross-sectional area which varies relative to the other channels in proportion to their respective lengths to equalize the pressure drop through the channels.

U.S. Pat. No. 3,926,676 to Frie et al. discloses a battery formed from a plurality of cells in which the main electrolyte inlet channel and outlet channels have a constant uniform cross-section with the outlet channel being the larger of the two with the individual cells having its electrolyte chamber connected with its own supply passage, which passages may have different cross-sections to vary the supply pressure of the electrolyte flow to the individual cells.

It is therefore an object of the invention to provide a fuel cell which forms part of a fuel stack that provides for the continuous supply of electrolyte to the matrix.

A further object of the invention is the provision of a method and system to restrict the flow rate in a stack of fuel cells so that the flow rate of the electrolyte is maintained substantially evenly to each fuel cell.

Yet another object of the invention is the provision of a stack of fuel cells in which an electrolyte reservoir is maintained at selected locations with respect to the fuel cell stack.

A further object of the invention is to provide a flow mechanism which relies upon a small pressure head in each cell to saturate the area around the matrix and then in turn to saturate all of the matrix.

SUMMARY OF THE INVENTION

In accordance with the teachings of the invention, fuel cells can be filled with an electrolyte, such as an acid, in any position, and filled with acid while in a horizontal position with the acid pressure to each cell being maintained at substantially the same, low pressure. Moreover, according to the teachings of this invention no additional components are necessary or required to be maintained, to be controlled or to be regulated by external forces, and regulation is essentially achieved by controlling the flow of acid through acid fill holes.

Heretofore, the filling holes or openings in the various components of the cell including the matrix have all been the same size. Accordingly, the usual practice, prior to the present inventions, has been to make the hole in the matrix the same size as the fill hole.

In accordance with the teachings of this invention, the fill hole is larger than the matrix hole opening. More specifically, the matrix hole opening is of a reduced size in diametrical extent such that the cross-sectional area of the matrix opening is preferably less than one-half ($\frac{1}{2}$) the cross-sectional area of the fill hole opening.

An exemplary opening in the matrix is a hole having a diameter of approximately one-sixteenth (1/16) of an inch and a circular cross-section, in conjunction with a fill hole approximately three-sixteenths (3/16) of an inch, also of a circular cross-section.

Another feature of the invention is that when the individual cells are assembled into a completed fuel cell stack, the assembled stack can be tilted, for example up to approximately 5°, so that one end of the end reservoir channel is higher than the other end. Thus, when acid is entered through the higher end, it will flow down the channel and initially wet a longer length of matrix exposed directly to the channel. The initial feed hole in the completed stack is positioned at the highest end if the stack is operated in a tilted, as opposed to horizontal, orientation.

In carrying out the invention and feeding acid to the stack, acid is slowly added to the fill hole, dipping in at a rate of approximately a drop per second initially. As the acid contacts the first matrix it will wet a local area; and proceed to saturate the entire matrix. As the pressure above this first matrix increases, it will cause the acid around the hole in the first matrix to spill through and enter the acid fill hole of the second or following fuel cell of the fuel cell stack and drop onto a second or following matrix which is below the first matrix. The acid in the hole spills over into the acid fill hole through the hole in the matrix dropping onto the matrix below it. At the same time, acid will also flow into a channel cut into the bipolar plate and located, for example, beneath the matrix. Acid entering this channel will then fill and/or saturate the matrix in each individual cell of the fuel cell stack. Finally as the channel becomes covered, it will begin to spill into the acid drain hole or outlet hole at the bottom or opposite end of the channel. Two drain tubes are provided and as the acid drips from either drain tube, the level of the cell can be adjusted by adjusting the tilt angle, when utilized, to make the drip rate from both drain tubes about equal. The drip rate of electrolyte applied to the fill tube should also be reduced so to keep the drain rate low.

The time required for these acid additions will vary with the amount needed for each cell. Of course, when the cells are dry a maximum of time is required when filling cells having dry assembled matrices and a minimum of time when adding only a few cubic centimeters per cell as a maintenance fill.

As will be apparent, operating cells can be filled while under load, so that with the present invention almost immediate improvement of performance should become readily apparent as a result of an effective acid fill. Presently used electrical resistance and open circuit voltage measurement techniques are used to signal the completion of acid feed for dry assembled cells.

As noted heretofore, the acid is supplied to each matrix of each fuel cell in seriatum at a uniform pressure so that the matrix of each cell of a completed cell stack can be either initially filled or replenished with electrolyte acid without exceeding the bubble pressure of the matrix or the flooding pressure of the electrodes on either side of the matrix.

Each individual cell is controlled in the same manner, and such control is achieved with and controlled by restricting the opening which opens to the fill hole for each next adjacent cell. Such restriction is accomplished in a preferred embodiment according to the invention with the matrix which is to be wet, by making the hole in the matrix smaller than the acid fill hole and slightly offsetting the matrix holes relative to the fill hole.

To these ends, the present invention consists in the provision of a fuel cell, preferably using an acid electrolyte having an anode electrode, a cathode electrode and a matrix interleafed therebetween to form a sandwich-type construction. The matrix of each cell has one pair of spaced acid fill openings extending therethrough, and the fill openings in the matrix are offset from the fill openings in the bipolar plates between which the matrix and electrodes are supported.

The invention is also directed to an acid electrolyte fuel cell stack which is formed from two or more acid fuel cells which are placed adjacent to each other, and each pair of adjacent fuel cells include therebetween a bipolar plate, and a bottom half-bipolar plate at the bottom of the fuel cell stack and a top half-bipolar plate at the top of the fuel stack, and the fuel cell stack further includes an acid fill hole in the top half-bipolar plate partially aligned and in fluid flow communication with the spaced fill openings in the matrices, and acid drain openings are provided in the bottom half-bipolar plate aligned with the spaced acid fill openings in the top half-bipolar plate, and the spaced fill openings in the matrices are axially aligned with each other to provide for an offset acid flow from the acid fill hole in the top-half bipolar plate to the drain openings so that the flow rate of the acid is restricted to maintain an even flow rate.

The acid fill hole is preferably perpendicular to the largest exposed face of the matrices so that the acid flows in a direction normal to the largest exposed face of each matrix and impinges onto all of the matrices.

The cross-sectional area of the fill openings in the matrices is smaller than the other acid flow through openings in the stack.

The tilt angle of the base of the fuel stack is adjustable so that acid can be made to drip substantially equally from each of the drain openings, and desirably the tilt angle is adjustable between 0° to 5° so that one end of the stack can be made higher than the other. If a tilt angle is utilized, it is preferred that the acid fill hole be positioned at the highest end of the tilted stack.

In a preferred embodiment, the cross-sectional area of the matrix fill opening is less than one-half the cross-sectional area of the acid fill hole.

Further, as the pressure above the first matrix increases, acid electrolyte is caused to enter the hole in the first matrix to spill over and enter the acid fill hole in the next adjacent fuel cell and drop onto the next following matrix.

Further, in one operative embodiment, the fill openings in the matrix are circular in cross-section and have a diameter of approximately one-sixteenth (1/16) of an inch.

In the operation of the fuel stack when it is being filled with acid electrolyte, as the pressure above the first matrix increases, acid is caused to enter the hole in the first matrix to spill over and enter the acid fill opening in the next adjacent fuel cell and drop onto a next following matrix.

In a system for adding acid electrolyte to the fuel cell stack, the electrolyte is added to the fuel cell stack through the acid fill hole in the top half-bipolar plate and drained from the acid drain openings in the bottom half-bipolar plate.

Electrolyte flows through a reservoir channel in each fuel cell beneath the matrix and onto the matrix beneath the openings in the bipolar plate containing the acid channel. The openings in the matrix are offset from electrolyte feed openings at both ends of the acid reservoir channel which is beneath the matrix.

In a preferred system for feeding acid electrolyte, it is fed to the fuel stack at an initial rate of approximately one drop at a time, and the acid electrolyte contacts the first matrix for saturation thereof and then proceeds to flow in two primary directions, one through the channel associated with each fuel cell and another through the openings in the matrix.

Other objects, advantages and the nature of the invention will become readily apparent to those skilled in the art as disclosed in the attached drawings and as described in the detailed description which follows:

BRIEF DESCRIPTION OF THE DRAWINGS

FIGS. 3A, 3B, 3C and 3D illustrate typical hole shapes which can be used for the acid fill holes and matrix holes, the relative cross-sectional areas between the matrix holes and acid holes are maintained;

DESCRIPTION OF THE PREFERRED EMBODIMENTS

Figure 1B:
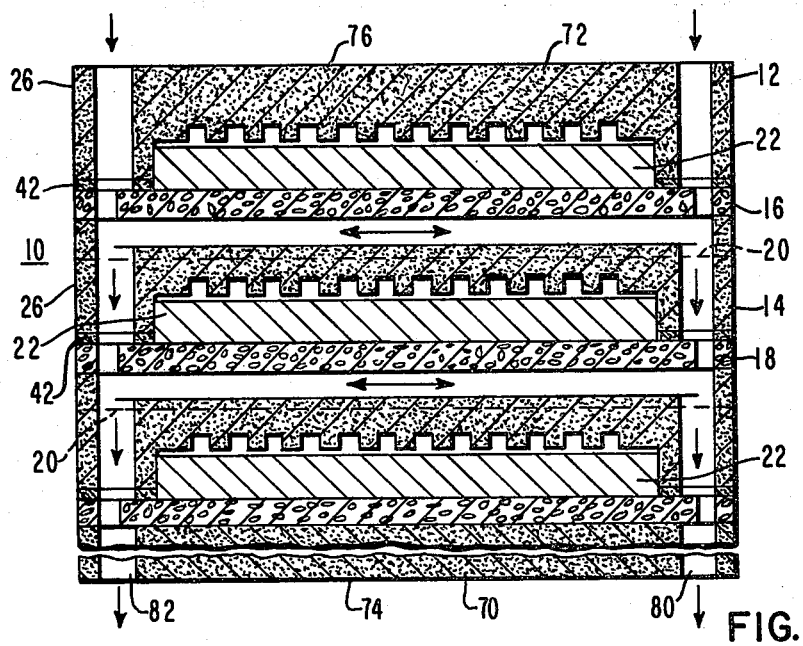
FIG. 1B is another section similar to FIG. 1A.
Figure 1A:
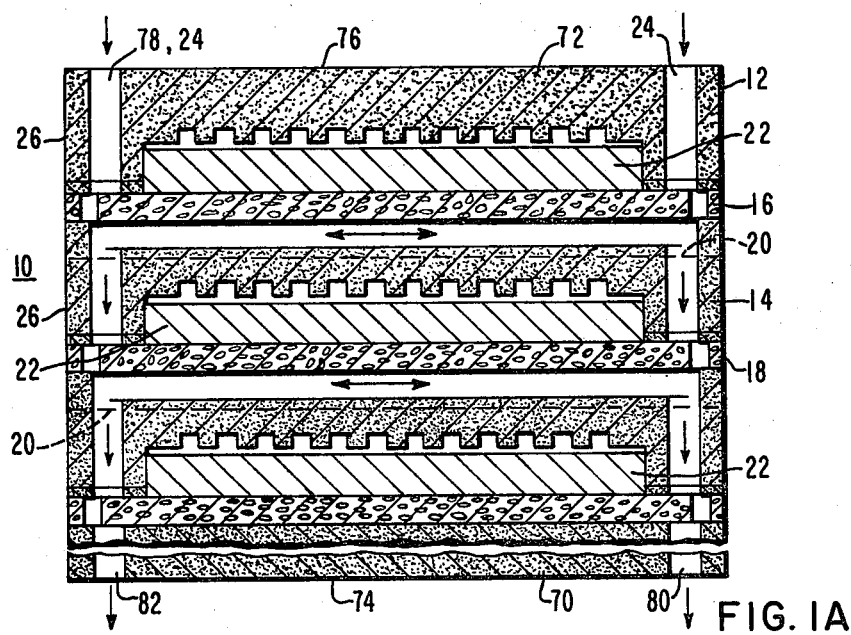
FIG. 1A is a schematic representation of a transverse section of a portion of a typical fuel cell stack taken along line 1—1 of FIG. 4.

Referring now more particularly to the drawings, and in particular to FIGS. 1A and 1B which schematically illustrate an exemplary fuel cell stack 10 comprised of a plurality of cells with two fuel cells 12, 14 being schematically shown with their respective matrices 16, 18, and the base 70 of a portion of a third cell. For the sake of simplicity, the conventional elements, such as the anode 20 and cathode 22 have been schematically shown. Also, while only two fuel cells 12, 14 have been shown, it is well known that the fuel cell stack 10 may be composed of a plurality of individual fuel cells.

Figure 4:
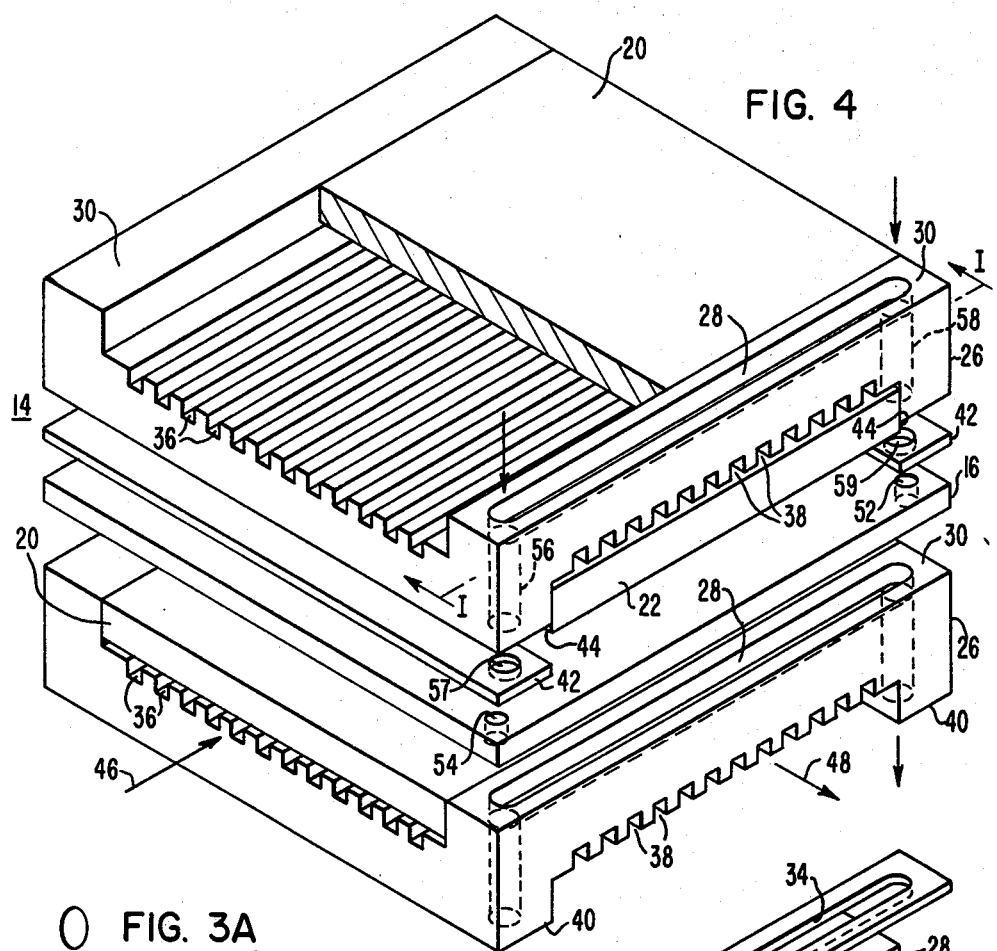
FIG. 4 is an exploded view of a single fuel cell with a shim removed for the sake of clarity according to the invention.
Figure 5:
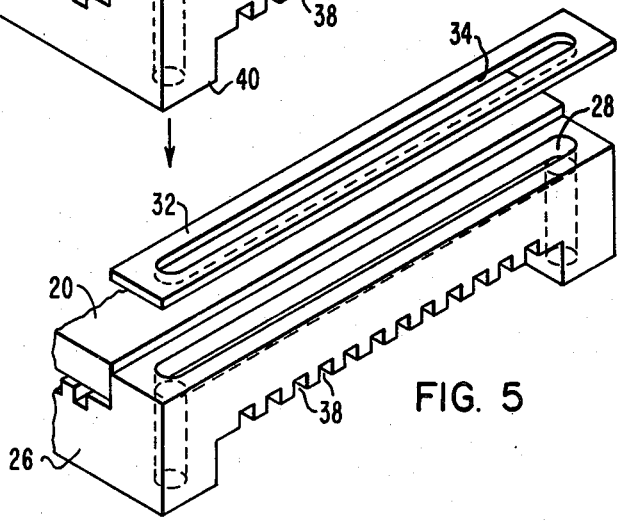
FIG. 5 is a partially perspective view of the single fuel cell of FIG. 4 with the shim arrangement adjacent the anode.

Referring now more particularly to FIGS. 4 and 5 of the drawings, the single fuel cell 14 is shown as comprising two bipolar plates 26 having an acid channel 28 on a top face 30 (see FIG. 4). When only a single cell is used or a cell is used as the top cell or bottom cell of the fuel stack, then the bipolar plate 26 takes a form which is referred to as a one-half bipolar plate or an end plate. In effect, the end plate or base is a half-bipolar plate. In a similar manner, top 72 is also a top end plate which is a one-half bipolar plate. When a base and top 72 are placed together at their smooth uniform surfaces 74, 76, they together form a bipolar plate 26. In FIG. 5, bipolar plate 28 on top face 30 is shown with shim 32, and acid conduit or through channel 34 on top of acid channel 28. In FIG. 4, shim 34 is omitted, but it is not absolutely necessary for the fuel cell to operate. The shim is necessary in some instances of assembly, between matrix 16 and top surface 30 of bipolar plate 26 or the base 70. It is to be noted that the acid electrolyte reservoir channel in a bipolar plate or shim can be positioned below, or above, a corresponding matrix.

In FIG. 4, the top plate is shown as a bipolar plate 26 having fuel channels 36 between the two top face portions 30, 30 through which fuel is circulated in a first direction and orthogonally thereto air or other oxidant is circulated through channels 38 between bottom face portions 40, 40 of bipolar plate 26. When bipolar plate 26 is used as a base, then oxidant channels 38 are omitted and bottom face portions 40, 40 form a continuous smooth surface, and in a similar manner, when bipolar plate 26 is used as a top end plate 72, then fuel channels 36 between top face portions 30, 30 are omitted and top face portions 30, 30 form the uniform continuous surface 76. Positioned between bipolar plate 26 and matrix 16 are a pair of edge shims 42 spaced from a pair of opposite edges 44 of cathode 22. When shims 32 are used with shims 42 they are orthogonally related so that shims 32 extend in a direction transverse to the direction of oxidant channels 38 and shims 42 extend in a direction transverse to fuel channels 36. While only one shim 32 is shown in FIG. 5, it will be obvious from FIG. 4, that the fuel cell bipolar plate 26 except for the acid channel is symmetrical and a shim 32 can be positioned between top face 30 and the bottom of matrix 16 adjacent to anode 20 parallel to the shim shown in FIG. 5. In FIG. 4, anode 20 extends the full width of the bipolar plate 26 in the direction of fuel flow as indicated by arrow 46. In FIG. 5, shim 32 is shown positioned at the edge of anode 20 and provided with acid conduit 34 in a direction transverse to the flow of air or oxidant 38 as indicated by arrow 48. In addition to the exemplary fuel cell configuration described, other configurations are possible.

Each matrix 16, 18 is provided with holes or openings 52, 54 in the form of cylinders or conduits which are axially aligned and spaced from each other by a distance Y from center line to center line of 52 and 54 which is greater than the distance X which is the spacing between the centers of openings or channels 56, 58 formed in shims 32, 42 and bipolar plate 26. Openings 56, 58 generally indicate the longitudinal openings or conduits formed in bipolar plate 26 and conduits 57, 59 in shim 42 and extend in a direction transverse or normal to the orthogonally related fuel path 46 and oxidant path 48. Openings 52, 54 form conduits in each matrix 16, 18 which are laterally offset from, or partially aligned with, conduits 56, 58, and 57, 59 respectively formed in bipolar plate 26 and shim 42.

Figure 2:
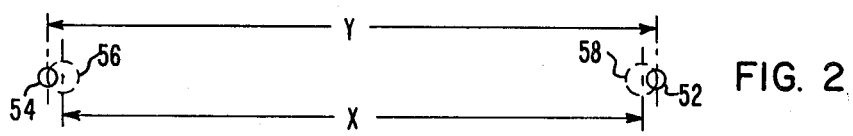
FIG. 2 is a diagrammatic representation of a pair of acid fill holes shown in dotted outline with a pair of matrix openings superimposed thereon illustrating the relative spacing and relative cross-sectional areas.

While the conduits 52, 54 and 56, 58 and 57, 59 are shown with a circular cross-section in FIG. 2, various other cylindraceously-shaped conduits may be used having differently-shaped cross-sectional configurations. FIG. 3A illustrates a conduit with an oval cross-section; FIG. 3B illustrates a semi-circular cross-sectional configuration; FIG. 3C illustrates a square cross-section; and FIG. 3D illustrates a triangular cross-sectional configuration.

While shims 42, 32 are shown in FIGS. 4 and 5 the shims are used as conventional insulators and as a means for taking up any inequities or spacings between the top face of bipolar plate 26 and the facing of the matrix because of the thickness and height of the anode above the bipolar plate 26 or the thickness and depth of the cathode below the bipolar plate.

It will be evident that with the fuel cell structure 12 and the fuel stack 10 composed thereof, a continuous parallel flow of the acid electrolyte is achieved. The venting through vent opening 78 (FIG. 1) can be provided to drive out air, and vent opening 78 can also be used as a fill hole either together with acid fill hole 24 or interchangeably therewith, with vent opening 78 being the acid fill hole and 24 being used as the vent hole. Ambient pressure is used to provide the driving force to the acid flow through the fuel cell stack and cooperates with the relative openings in the matrix and the electrodes as well as the drain holes 80 and 82 to restrict the electrolyte flow rate to maintain the flow rate evenly; drain hole 80 is aligned with fill hole 24 and drain hole 82 is aligned with vent opening 78.

A small reservoir for each cell is provided by acid channel 28 so that each individual cell 12, if desired, could be wetted from a separate port 81.

The electrolyte flows horizontally as distinguished from a vertical orientation, and when the electrodes and matrix are in a horizontal position a more uniform pressure can be obtained and there is less weight of the electrolyte pressing down.

While only one fill hole 24 has been shown, it is possible to have a hole on all four corners with three being used as fill holes or alternatively two holes are used as fill holes 24 and two holes are used as vent holes 78.

While there has been shown what is presently considered to be the preferred embodiments and best mode for carrying out the invention, it will be obvious that various changes and modifications may be made therein without departing from the scope of the invention.

I claim:

1. In a fuel cell utilizing a liquid electrolyte and having an anode electrode, a cathode electrode and a matrix sandwiched between plates,
 a pair of spaced electrolyte fill openings extending through said plates and said matrix;
 said fill openings in said matrix being offset from and partially aligned with said fill openings in said plates.

2. In the fuel cell as claimed in claim 1, wherein the distance between axial centers of said fill openings in said matrix is greater than the distance between axial centers of said fill openings in said plates.

3. In the fuel cell as claimed in claim 1, wherein the cross-sectional area of said matrix fill opening is less than one-half the cross-sectional area of said fill opening in said plates.

4. In the fuel cell as claimed in claim 1, wherein the cross-sectional configuration perpendicular to the longitudinal axis of said fill openings in said matrix is of a non-circular configuration.

5. In a fuel cell stack formed from at least two fuel cells according to claim 1, adjacent to each other, having a bipolar plate between each said two adjacent fuel cells, a bottom half-bipolar plate at the bottom of the fuel cell stack and a top half-bipolar plate at the top of the fuel stack, said fuel cell stack including:
 an electrolyte fill hole in said top half-bipolar plate partially aligned with one of said pair of spaced fill openings in said matrices;
 electrolyte flow through openings in said bipolar plate aligned with said spaced fill openings in said matrices; and
 electrolyte drain openings in said bottom half-bipolar plate aligned with said spaced fill openings in said matrices;
 said spaced fill openings in said matrices being axially aligned with each other to provide for an offset electrolyte flow from said fill hole in said top-half bipolar plate to said drain openings so that the flow rate of the electrolyte is restricted to maintain an even flow rate.

6. In the fuel cell stack of claim 5, wherein said electrolyte fill hole is perpendicular to the largest exposed face of said matrices so that the electrolyte flows in a direction normal to said largest exposed face of each said matrix and impinges onto all of said matrices.

7. In the fuel cell stack of claim 6, wherein the cross-sectional area of the fill openings in said matrices is smaller than the other electrolyte flow through openings in said stack.

8. In the stack as claimed in claim 5, wherein means are included for adjusting an angle of tilt of the base of said fuel stack formed by an outer face of said bottom-half bipolar plate so that electrolyte drips substantially equally from each said drain opening.

9. In the stack as claimed in claim 8, wherein the angle of tilt is adjustable between 0° to 5°.

10. In the stack as claimed in claim 8, wherein said stack is tilted and said electrolyte fill hole is positioned at the highest end of said tilted stack.

11. In the stack as claimed in claim 5, including:
a vent hole in said top half-bipolar plate axially aligned with one of said aligned fill openings in said matrix and horizontally spaced from said electrolyte fill hole in said top half-bipolar plate and axially aligned with one of said electrolyte drain openings.

12. In the fuel cell stack as claimed in claim 5, wherein the cross-sectional area of said matrix fill opening is less than one-half the cross-sectional area of said electrolyte fill hole.

13. In the fuel cell stack as claimed in claim 5, wherein each said bipolar plate includes an electrolyte reservoir channel connecting said electrolyte flow through openings in said bipolar plate.

14. In the fuel cell stack as claimed in claim 5, wherein said bottom-half bipolar plate includes an electrolyte reservoir connecting said drain openings.

15. In the fuel stack as claimed in claim 5, wherein as the pressure in the electrolyte fill opening above the first matrix increases, electrolyte is caused to enter the hole in the first matrix and to spill over and enter the electrolyte fill opening in the next adjacent fuel cell and drop onto a next following matrix.

16. In the fuel stack as claimed in claim 5, wherein the electrolyte flows into a channel in each said bipolar plate below the matrix and flows therefrom into fluid contact with said matrix.

17. In a system for adding an acid electrolyte to the fuel cell stack as defined in claim 5, wherein the electrolyte is added to said fuel cell stack through said electrolyte fill hole in said top-half bipolar plate and drained from said electrolyte drain openings in said bottom-half bipolar plate.

18. In the system as claimed in claim 17 wherein said fuel stack includes an acid electrolyte reservoir channel in each said fuel cell and the electrolyte flows through said reservoir channel below said matrix and into the openings in said plates and said matrix.

19. The system as claimed in claim 17 wherein, in each said fuel cell openings in said matrix are offset from electrolyte feed openings to said acid electrolyte reservoir channel which is at a level higher than said matrix.

20. In the system as claimed in claim 17, including means for feeding acid electrolyte to the fuel stack at an initial rate of one drop at a time.

21. In a system as claimed in claim 17, wherein the acid electrolyte contacts the first matrix for saturation thereof and then proceeds to flow through said fill opening in said matrix and said electrolyte flow through opening of said bipolar plate and also into said electrolyte reservoir channel provided in said bipolar plate.

22. In the system as claimed in claim 17, wherein the pressure above the first matrix increases, acid electrolyte is caused to enter the hole in the first matrix to spill over and enter the electrolyte fill hole in the next adjacent fuel cell and drop onto the next following matrix.

23. In the system as claimed in claim 17, including two concurrent flow mechanisms comprising said electrolyte flow through openings in said bipolar plate and said spaced fill openings in said matrices responsive to a pressure head created as the electrolyte is applied through said electrolyte fill hole in said top half-bipolar plate and to saturate the area around said holes in said matrices and then saturate said matrices.

24. In a fuel cell as claimed in claim 1, wherein said fill openings in said matrix are circular in cross-section and have a diameter of approximately one-sixteenth (1/16) of an inch.

25. In the fuel cell as claimed in claim 1, wherein the cross-sectional area of said fill openings in said matrix is less than one-half the cross-sectional area of said fill openings in said plates.

* * * * *